United States Patent
Schneider et al.

(10) Patent No.: US 9,687,903 B2
(45) Date of Patent: Jun. 27, 2017

(54) METHOD FOR PRODUCING AN ASSEMBLY UNIT

(71) Applicant: RICHARD BERGNER VERBINDUNGSTECHNIK GMBH & CO. KG, Schwabach (DE)

(72) Inventors: Wilhelm Schneider, Rednitzhembach (DE); Juliane Niedermueller, Buechenbach (DE); Klaus Dehlke, Windsbach (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 137 days.

(21) Appl. No.: 14/554,367

(22) Filed: Nov. 26, 2014

(65) Prior Publication Data
US 2015/0151347 A1    Jun. 4, 2015

(30) Foreign Application Priority Data
Nov. 28, 2013 (DE) .......................... 10 2013 019 868

(51) Int. Cl.
*B21D 28/02* (2006.01)
*B21D 39/03* (2006.01)
*B23K 11/00* (2006.01)

(52) U.S. Cl.
CPC ............. *B21D 28/02* (2013.01); *B21D 39/03* (2013.01); *B23K 11/0066* (2013.01);
(Continued)

(58) Field of Classification Search
CPC ......... Y10T 29/49737; Y10T 29/49742; Y10T 29/49833; Y10T 29/49835; Y10T 29/49837; Y10T 29/49906; Y10T 29/49908; Y10T 29/49915; Y10T 29/49925; Y10T 29/49934;
(Continued)

(56) References Cited

U.S. PATENT DOCUMENTS 2,854,074 A * 9/1958 Frank ..................... B21D 39/03
                                                                174/126.1
4,130,922 A * 12/1978 Koett .................... B21J 15/025
                                                                29/243.53
(Continued)

FOREIGN PATENT DOCUMENTS

CN          201754036 U      3/2011
CN          202759348 U      2/2013
(Continued)

*Primary Examiner* — Peter DungBa Vo
*Assistant Examiner* — Joshua D Anderson
(74) *Attorney, Agent, or Firm* — Laurence A. Greenberg; Werner H. Stemer; Ralph E. Locher

(57) ABSTRACT

An assembly unit is produced according to the following method steps: an assembly part is provided which does not yet have a through bore. A disc-shaped welding element blank with a first end side, a second end side and a peripheral surface is stamped out of a sheet metal blank by a punch and a hole die so that the peripheral surface has a cylindrical longitudinal portion extending away from the first end side, and an adjoining cone portion which tapers towards the second end side and forms with this a cutting edge. The welding element blank is stamped with the cutting edge at the front into the assembly part to thereby form the through bore.

12 Claims, 11 Drawing Sheets

(52) U.S. Cl.
CPC .... *Y10T 29/49833* (2015.01); *Y10T 29/49835* (2015.01); *Y10T 29/49837* (2015.01); *Y10T 29/49906* (2015.01); *Y10T 29/49908* (2015.01); *Y10T 29/49925* (2015.01); *Y10T 29/49938* (2015.01); *Y10T 29/49943* (2015.01); *Y10T 403/4966* (2015.01); *Y10T 403/4974* (2015.01)

(58) Field of Classification Search
CPC ......... Y10T 29/49938; Y10T 29/49941; Y10T 29/49943; Y10T 29/49945; Y10T 29/49954; Y10T 29/49956; Y10T 29/49957; Y10T 29/49968; Y10T 403/4958; Y10T 403/4966; Y10T 403/4974; Y10T 403/53717; Y10T 403/5377; Y10T 403/53774; B21D 28/02; B21D 28/24; B21D 28/26; B21D 31/04; B21D 35/00; B21D 35/02; B21D 39/03; B21D 39/031; B21D 39/032; B21D 39/034; B21D 39/035; B23K 11/0066; B23K 11/002; B23K 11/004; B23K 11/093; B23K 11/185; B23K 11/20; B23K 20/02; B23K 2201/006; B23K 2201/185; B23K 2203/18; B21J 5/02; B21J 15/02; B21J 15/08; B23P 11/005; B23P 19/02; F16B 5/04
USPC .......... 72/325–328, 330, 332, 333, 337–339, 72/352, 356, 360, 363, 364, 700; 29/243.517, 243.53, 243.54, 402.13, 29/402.16, 432, 432.1, 432.2, 469.5, 505, 29/509, 515, 524, 524.1, 525, 525.05, 29/525.06, 525.07, 525.14; 219/91.2, 219/117.1; 228/164, 170, 171, 173.1, 228/173.2, 173.3, 173.6, 265; 403/281–283
See application file for complete search history.

(56) References Cited

U.S. PATENT DOCUMENTS

| | | | | |
|---|---|---|---|---|
| 5,100,050 | A | * | 3/1992 | Krueger ................. B21J 5/00 228/193 |
| 5,263,353 | A | * | 11/1993 | Bakermans ............ B21D 28/06 29/874 |
| 7,165,312 | B2 | * | 1/2007 | Vrana .................. B23P 19/062 29/243.5 |
| 2002/0166843 | A1 | | 11/2002 | Wang et al. |
| 2008/0197117 | A1 | * | 8/2008 | Jin ....................... B21D 39/034 219/78.15 |
| 2009/0294410 | A1 | * | 12/2009 | Iwase ................... B21J 15/025 219/91.23 |
| 2013/0205574 | A1 | * | 8/2013 | Doo ...................... B21J 15/025 29/524.1 |
| 2013/0270229 | A1 | * | 10/2013 | Pedersen ................ B21J 15/02 219/106 |
| 2014/0224774 | A1 | | 8/2014 | Chergui et al. |

FOREIGN PATENT DOCUMENTS

| | | |
|---|---|---|
| EP | 0967044 A2 | 12/1999 |
| JP | 2014516793 A | 7/2014 |

* cited by examiner

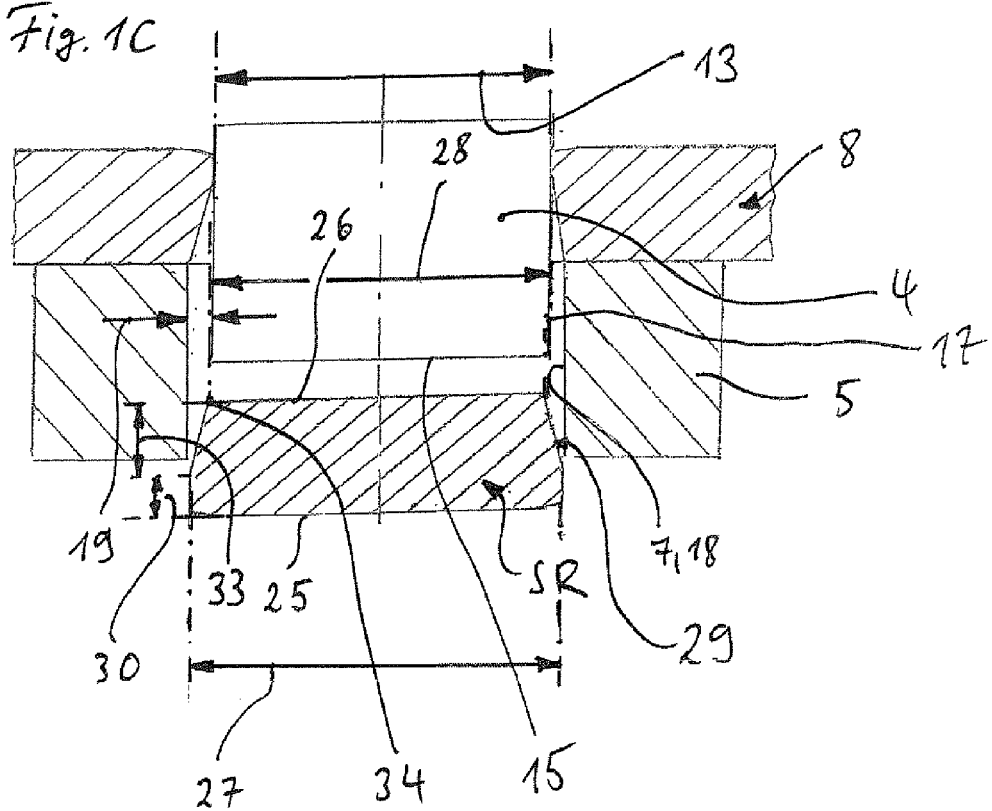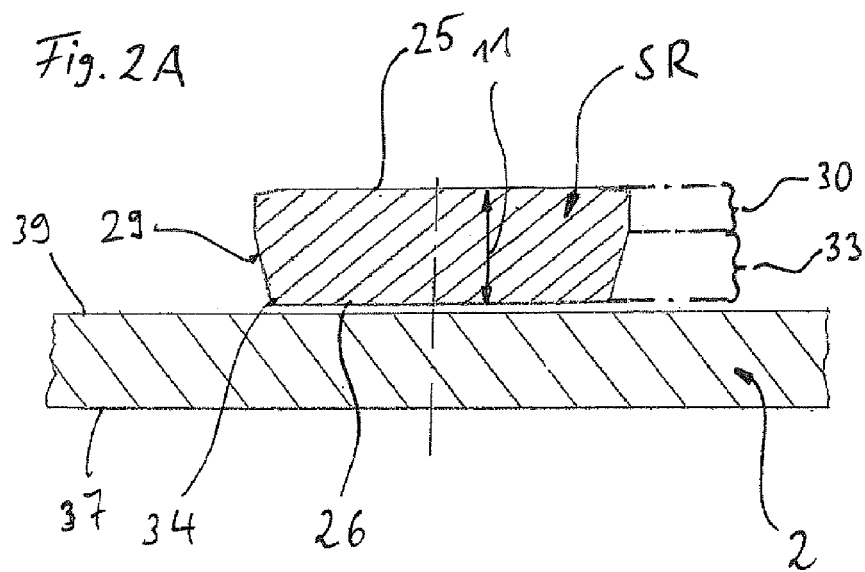

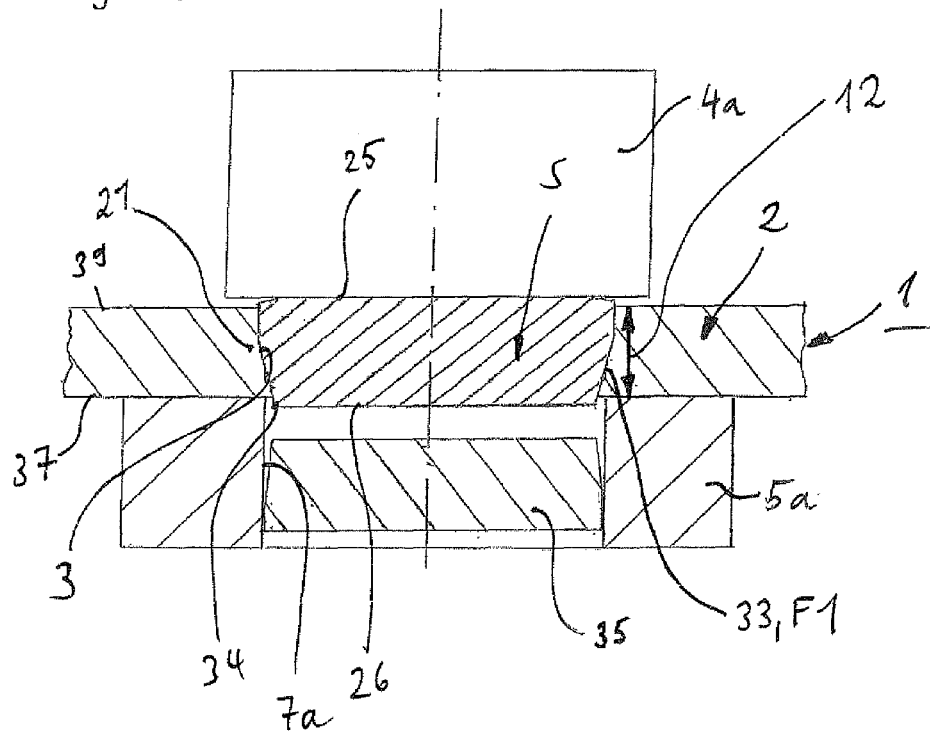
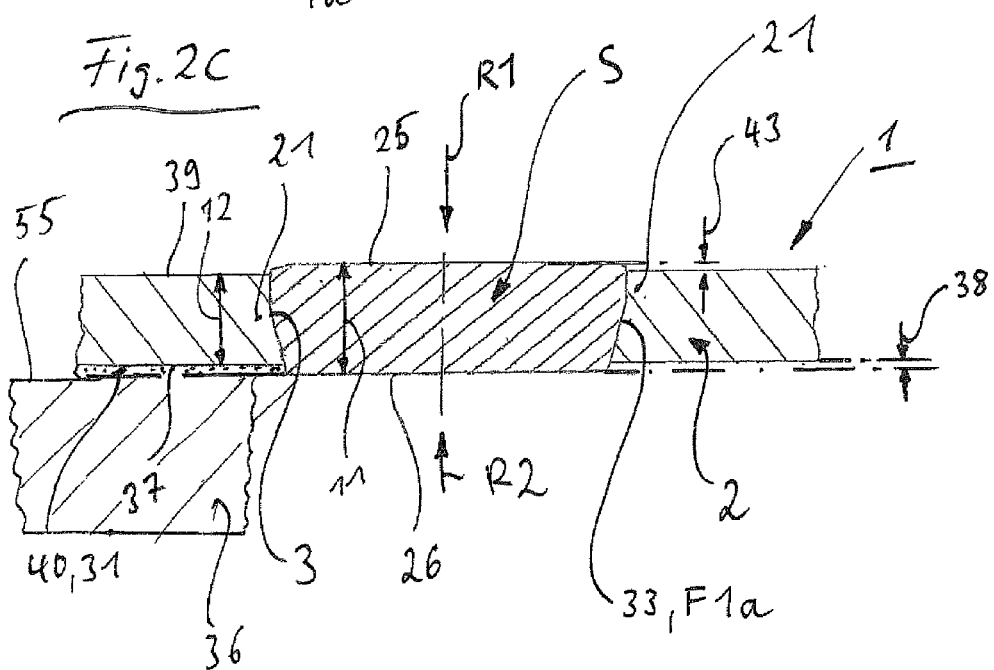

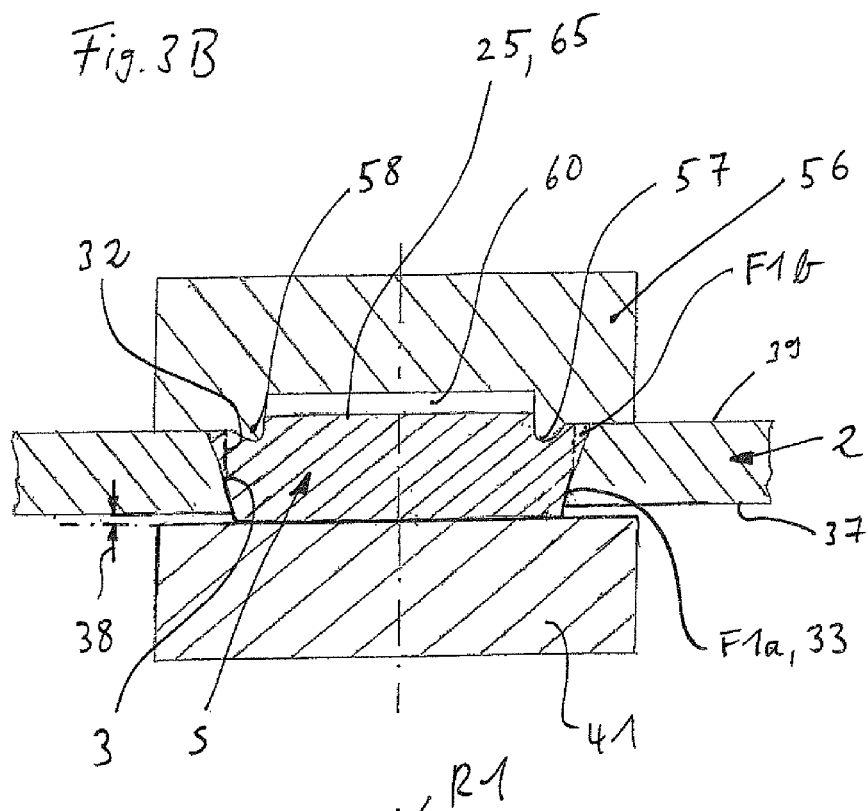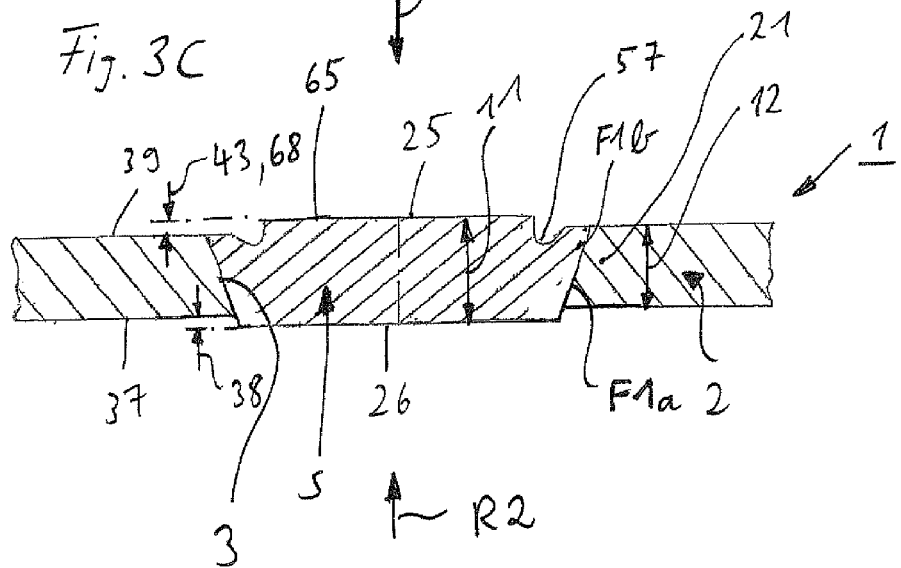

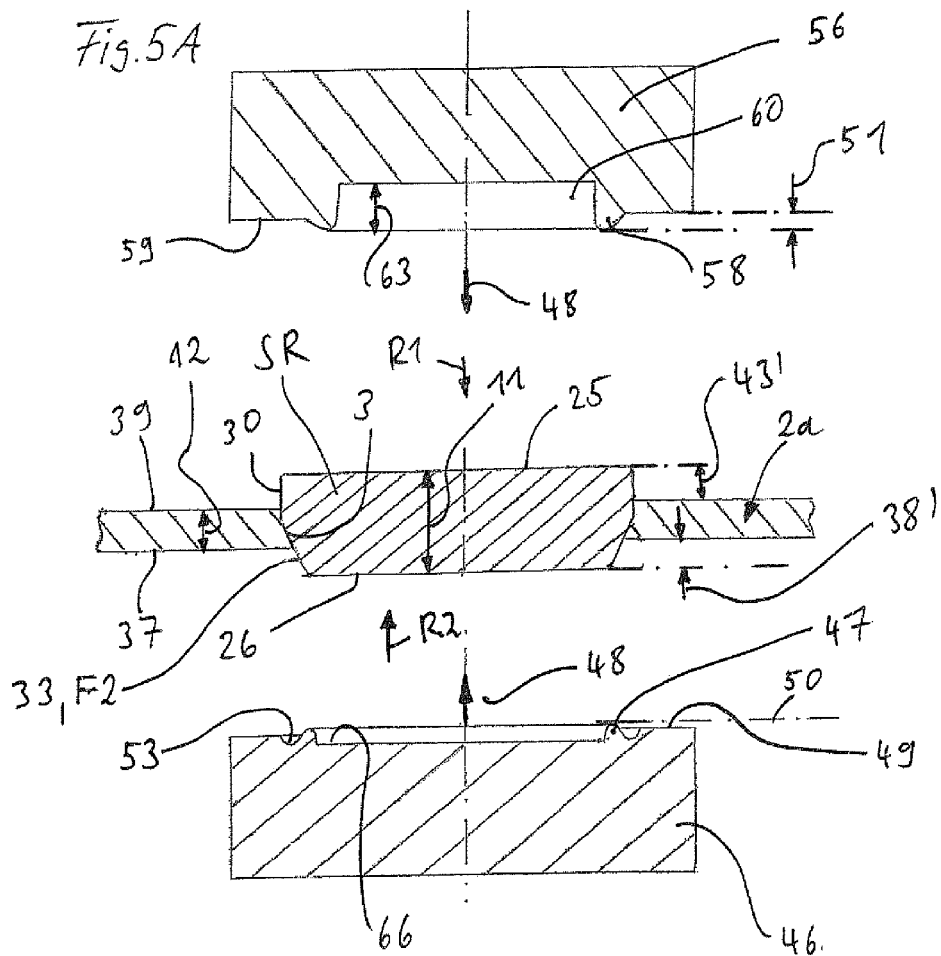
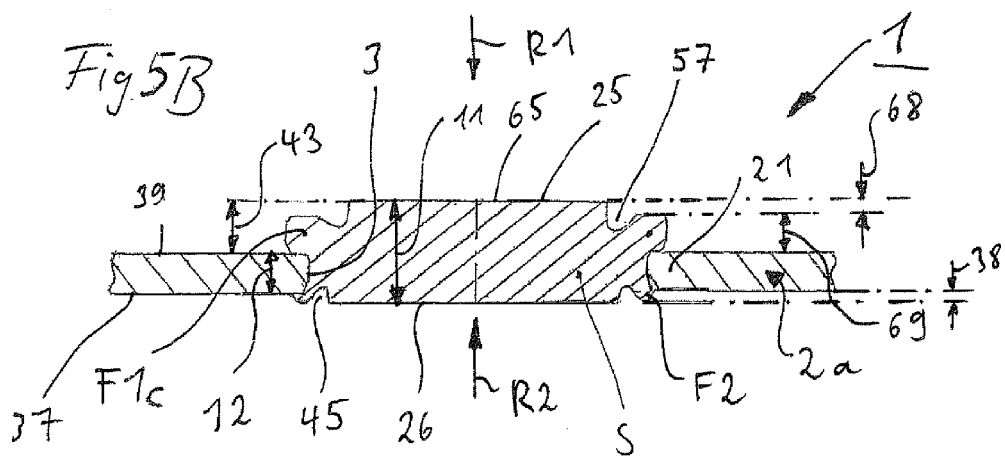

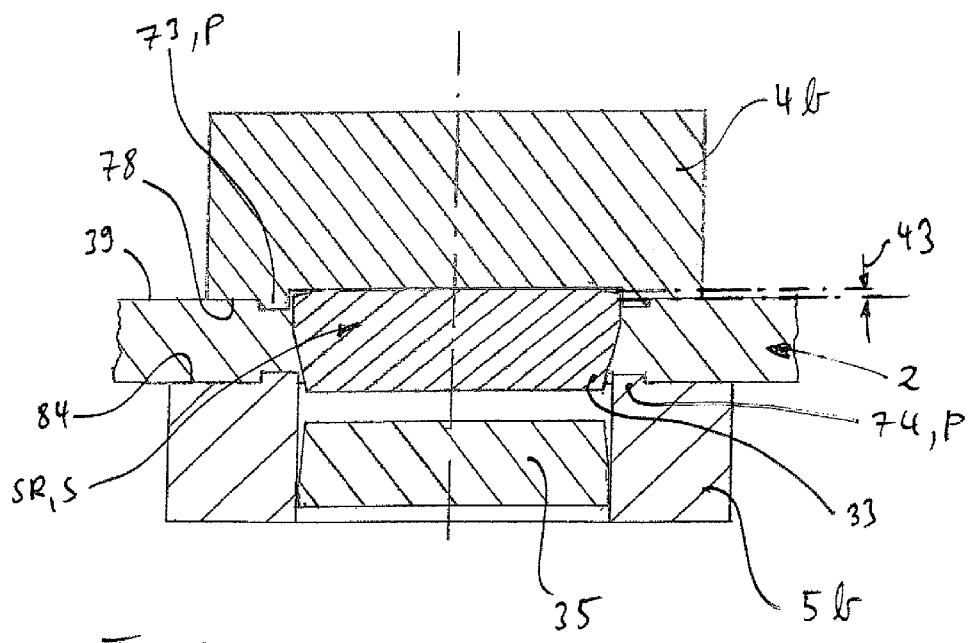
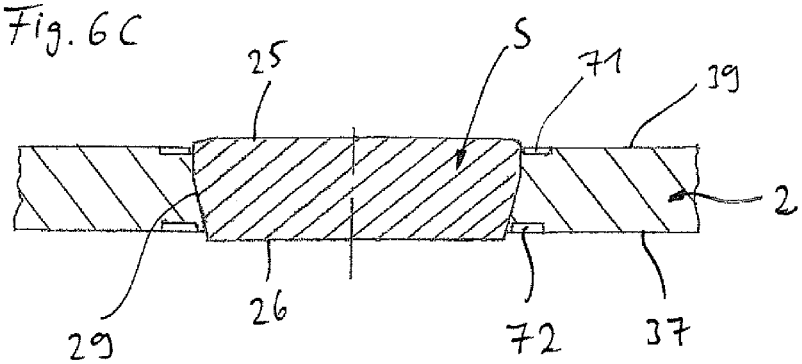

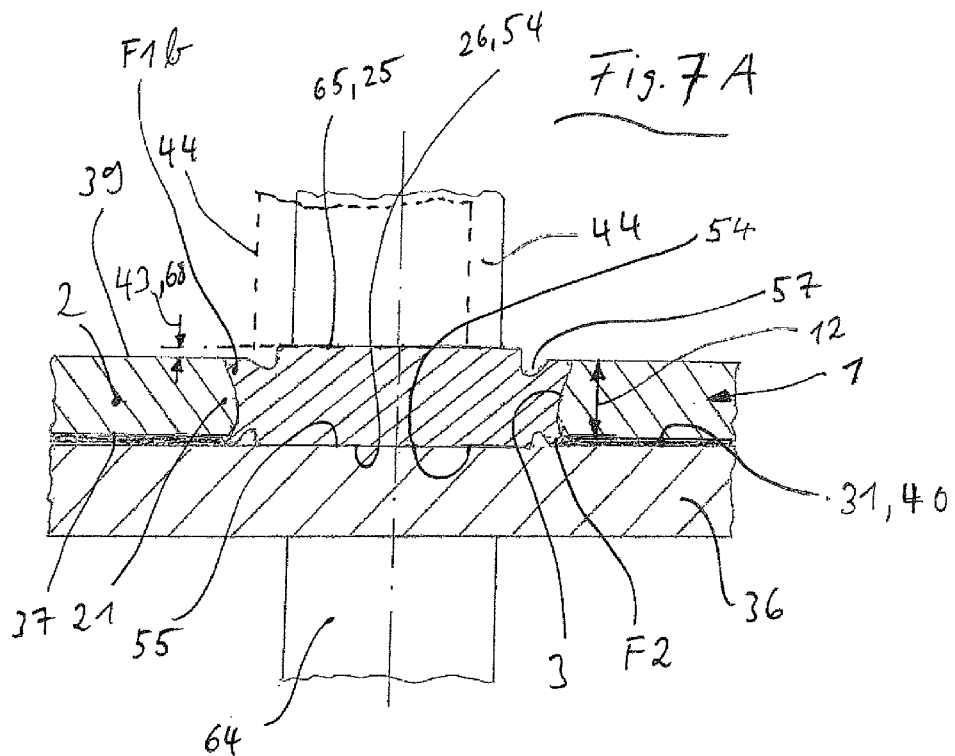
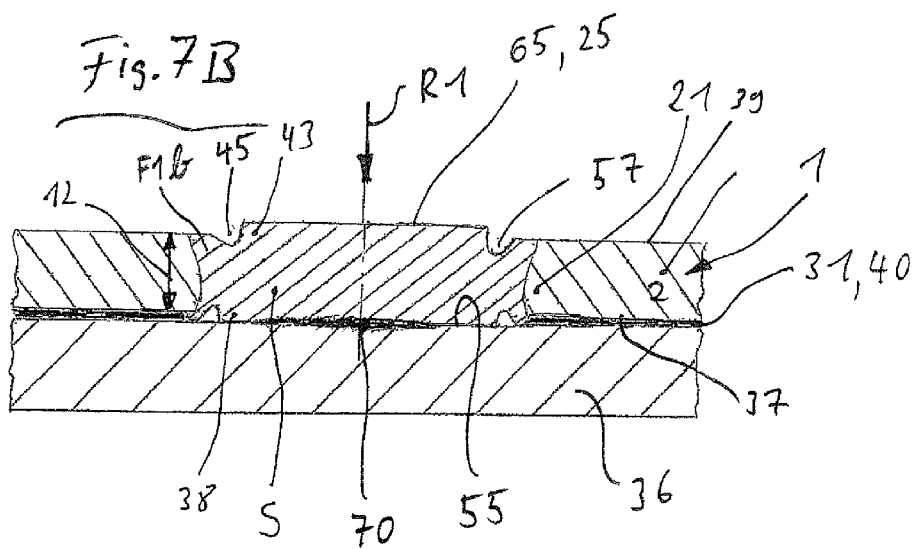

METHOD FOR PRODUCING AN ASSEMBLY UNIT

BACKGROUND OF THE INVENTION

Field of the Invention

The invention relates to a method for manufacturing an assembly unit.

The fixing of an assembly unit, by way of example a sheet-metal-like body part on a basic structure of a motor vehicle, is in many cases carried out by spot or resistance welding. Particularly in automobile construction assembly parts of light materials such as aluminium are often used for weight-saving reasons. If a non-weldable material mix is thereby produced, i.e. if the material of the assembly part cannot be welded to the material of the basic structure, then the assembly part is fitted with one or more welding elements which consist of a material which from the welding point of view is compatible with the material of the basic structure. The welding element is fixed in a through bore of the assembly part wherein the latter has an assembly side and an outer side facing away from the latter. When the assembly unit or the assembly part is fixed on a surface of the basic structure, which will be called the counter face in the following, the assembly side faces the counter face.

For manufacturing an assembly unit which is known from EP 0 967 044 A2 a disc-like self-stamping welding element blank is provided, i.e. an assembly part is used which has not yet been provided with a through bore. The production of the through bore and the fixing of the welding element therein take place moreover in a single step in which the welding element blank is stamped into the assembly part and thereby serves itself as the stamping tool. So that the welding element blank or the welding element is held with sufficient stability in the through bore and the assembly part is thereby fixed securely on the basic structure, a form-fitting element is provided in the known method which radially overlaps the assembly part on its outer side. The form-fitting element has in this case a flange projecting radially over the edge of the through bore. Furthermore the welding element blank is provided with a sharp-edged stamping collar protruding out from an end side of the welding element blank wherein this is to facilitate the stamping, and after stamping is bent radially outwards thereby forming a further form-fitting element and thus preventing the welding element from falling out of the assembly part against the stamping direction.

The drawback with the known assembly unit is that supplying or creating a self-stamping welding element blank which has a sharp-edged stamping collar or a radially protruding flange is complex.

BRIEF SUMMARY OF THE INVENTION

Based on this the object of the invention is to provide a method of the type mentioned at the beginning which can be carried out at a lower cost.

This is achieved by a method as claimed. According to this, in order to produce an assembly unit of the type mentioned at the beginning first an assembly part is provided which does not yet have a through bore. The disc-like welding element blank which is provided for stamping into the assembly part and which as a result of its disc-like configuration has a first and a second end side as well as a peripheral surface, is stamped out of a sheet metal blank by means of a punch and a hole die. The welding element blank is thus a punched-out piece. The stamping out is thereby executed so that the peripheral surface has a cylindrical longitudinal section extending away from the first end side, and an adjoining cone section which tapers towards the second end side and with this forms a cutting edge.

With the said stamping process the shape of the peripheral surface in question is then formed for example when the transverse extension of the punch extending crosswise to the stamping direction is smaller than the corresponding transverse extension of the die hole, which will be explained in further detail below. When using a circular round welding element blank for producing the assembly unit to which reference is made below by way of example, the diameter of the punch is thus smaller than the diameter of the die hole. It has been seen that the transition between the conical peripheral surface which is also called the break-out surface, and the corresponding end side of the welding element blank forms a relatively sharp cutting edge so that the welding element blank forms at the same time a stamping tool without the need for further processing of the welding element blank.

The welding element blank which is produced in the aforesaid manner is driven with the cutting edge at the front into the assembly part, possibly with the aid of a punch which is moved in a lifting direction. The cone section which extends away from the cutting edge forms with the assembly part and the resulting through bore a form-fitting engagement in the said lifting direction or in a direction pointing towards the outer side of the assembly part. The form-fitting engagement is thereby already sufficient for numerous applications so that in this respect a further processing of the welding element blank is not necessary, i.e. the latter already forms the finished welding element.

In order to guarantee a problem-free stamping of the welding element blank into the assembly part it is advantageous if the blank consists of a material which has a greater hardness compared with the material of the assembly part.

The welding element blank or the welding element is fixed in the through bore with friction-locking engagement in the counter direction pointing opposite the press-in direction. Since the cone section of the welding element is formed by breaking the material it has a relatively high roughness which increases the friction-locking fixing of the welding element. The surface roughness can thereby be formed so that a micro positive engagement arises between the peripheral surface of the cone section and the wall of the through bore. The welding element is therefore fixed firmly against the stamping or press-in direction in the through bore of the assembly part so that the welding element cannot become lost during transport and handling of the assembly unit.

BRIEF DESCRIPTION OF THE SEVERAL VIEWS OF THE DRAWING

The invention and further advantageous developments indicated in the dependent claims will now be explained in further detail with reference to the accompanying drawings. These each show in diagrammatic cross-sectional illustrations:

FIG. 1A-C the creation of a welding element blank by stamping out a punched part from a sheet metal blank by means of a punch and a hole die;

FIG. 2A-C the pressing of the welding element blank with a punch and a hole die into an assembly part;

FIG. 3A-C a plastic deformation of the welding element blank for producing an axially active form-fitting engagement between the welding element and assembly part;

FIG. 5A,B a modification of the variation of FIG. 4A-C,

FIG. 6A-C the pressing of the welding element blank with an alternative punch and an alternative hole die into an assembly part;

FIG. 7A,B the welding of an assembly unit with a basic structure.

DESCRIPTION OF THE INVENTION

To manufacture an assembly unit 1 which comprises an assembly part 2 with at least one through bore 3 and a welding element S fixed therein, an assembly part 2 is provided in which there is still no through bore 3. This is formed when a self-stamping welding element blank SR is driven or stamped into the assembly part 2.

Figure 1A:
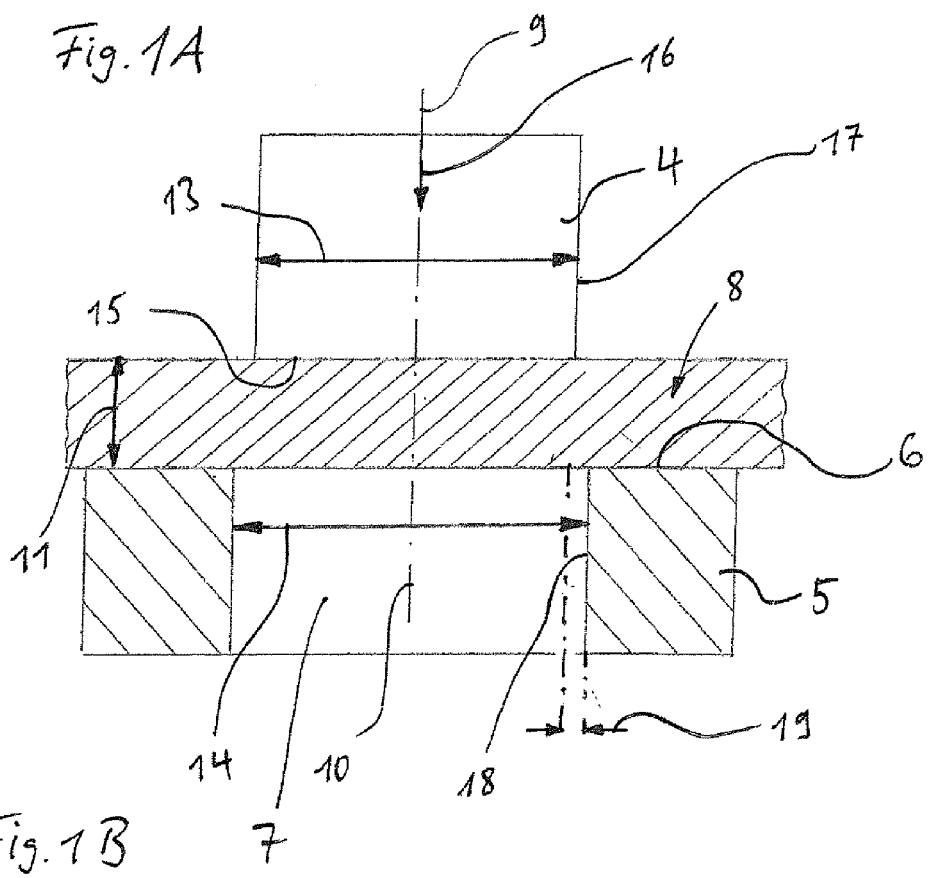
Figure 1B:
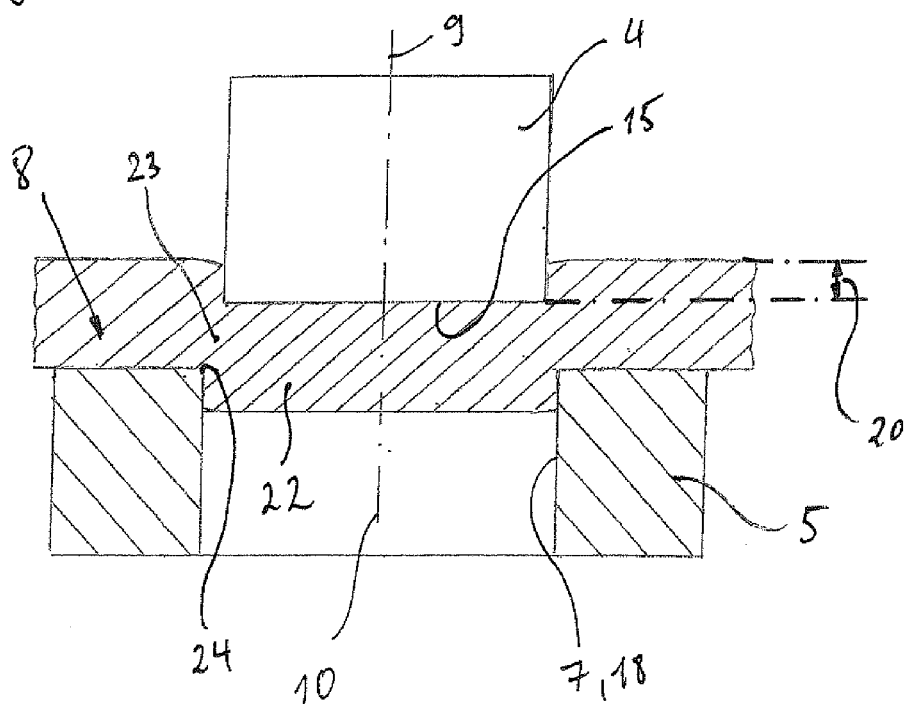
Figure 34:
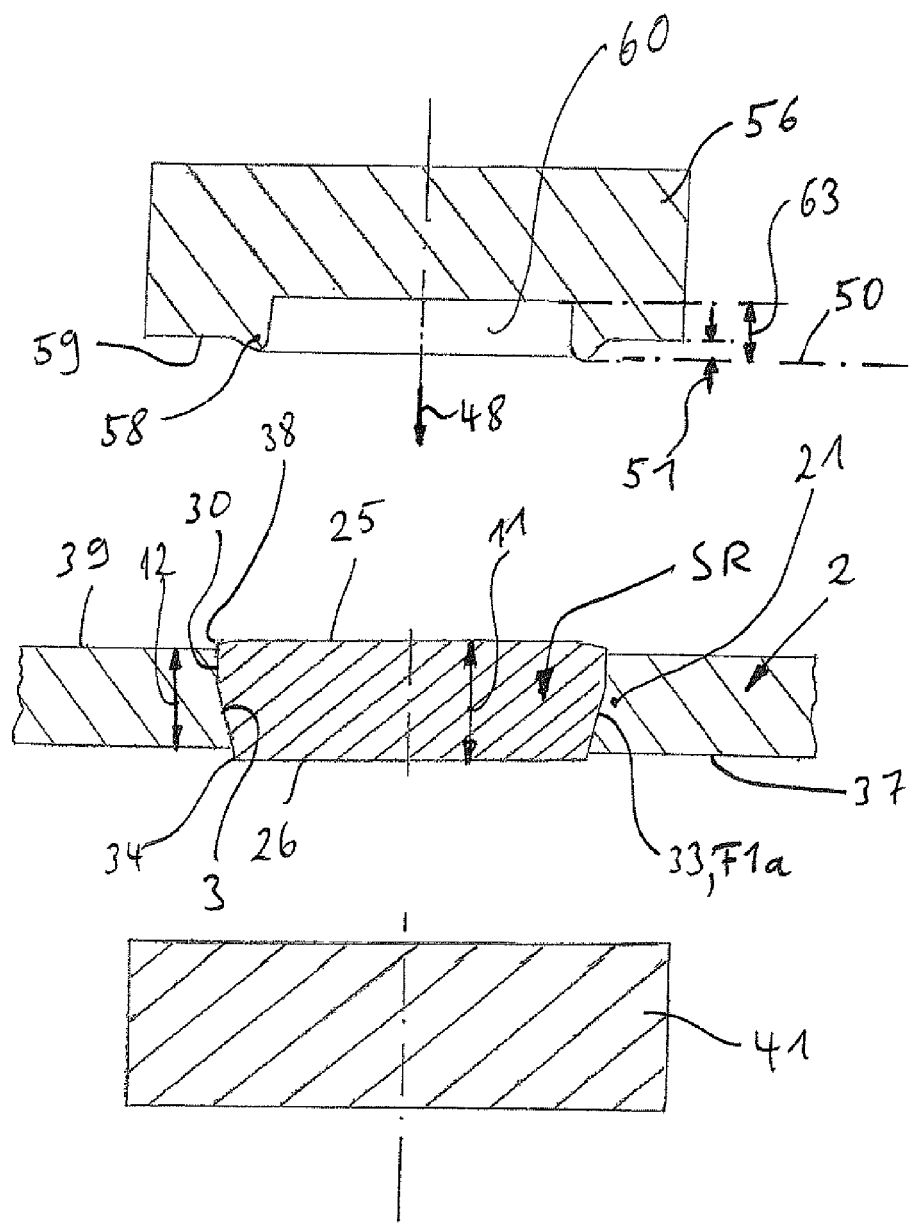

The creation of the self-stamping welding element blank SR is carried out according to FIGS. 1A-C with the aid of a punch 4 and a hole die 5 which is pierced by a die hole 7. The hole die 5 comprises a preferably flat bearing face 6 into which the die hole 7 opens. A sheet metal blank 8 is placed on the bearing face 6 of the hole die 5 so that it completely covers the die hole 7. The die hole 7 and the punch 4 preferably have a circular round cross-sectional shape. The punch 4 is set onto the side of the sheet metal blank 8 facing away from the hole die 5 so that it is arranged central relative to the die hole 7, i.e. so that its center longitudinal axis 9 aligns with the center longitudinal axis 10 of the die hole 7 and the said axes run coaxial relative to one another. The diameter 13 of the punch 4 is smaller than the diameter 14 of the die hole 7. The end side 15 of the punch 4 facing the sheet metal blank 8 is flat and when the punch 4 is driven forwards in the stamping direction 16 bears against the sheet metal blank 8 with its entire surface area.

As a result of the different diameters 13, 14 a so-called cutting gap 19 is formed between the cylindrical peripheral surface 17 of the punch 4 and the wall 18 of the die hole 7. In a first phase of the stamping process the punch penetrates a piece further into the sheet metal blank 8 wherein material 22 of the sheet metal blank 8 displaced by the punch 4 is forced into the die hole 7. The material thereby completely fills out the cross-section of the die hole 7. Depending on the relevant thickness 11 and the material of the sheet metal blank 8 as well as on the size of the cutting gap 19, at a specific penetration depth 20 of the punch 4, a break occurs in the material region 23 of the sheet metal blank 8 which is located between the edge of the end side 15 and the hole edge 24 which forms the transition from the bearing face 6 to the wall 18 of the die hole. The break-off surface thereby arising on the resulting punched piece tapers towards the punch 4.

After the said material break-off the welding element blank SR falls out downwards from the die hole 7. As a result of the stamping process described the peripheral surface 29 of the welding element blank comprises a cylindrical longitudinal portion 30 adjoining the first end face 25, and a cone portion 33 tapering towards the second end face 26. The diameter 27 of the first end side 25 or the cylindrical longitudinal portion 30 corresponds substantially to the diameter 14 of the die hole 7. The diameter 28 of the second end side 26 is smaller than the diameter 27 of the first end side 25. It corresponds substantially to the diameter 13 of the punch 4. A sharp cutting edge 34 is formed at the transition between the second end face 26 and the cone portion 33 as a result of the material break described above during the stamping process.

The cutting edge 34 is used as the stamping edge to produce an assembly unit by means of a welding element blank SR produced with the procedure described above, i.e. as can be seen from FIG. 2A the welding element blank SR is stamped with its leading cutting edge 34 into one of the two sides 37, 39 of the assembly part by means of a punch 4*a* so that the welding element blank SR or the welding element S passes through the assembly part 2 whilst forming the through bore 3. With this pressing process a counter holder is used in the form of a hole die 5*a* wherein when forming the through bore 3 in the assembly part 2 a punched piece 35 is formed as a by-product which falls out from the die hole 7*a*.

The two method steps, namely on the one hand the creation of the self-stamping welding element blank SR and on the other hand the stamping of the self-stamping welding element blank SR into an assembly part 2 for producing an assembly unit 1, are preferably carried out so that the welding element blank SR (FIG. 1C) ejected from the hole die 5 is supplied by way of example by means of a conveyor belt (not shown) to a work station according to FIGS. 2A-C. The welding element blank SR thereby lies in a defined position in which its second end side 26 supporting the cutting edge 34 points upwards. It can then either in this position, or reversed, i.e. with the cutting edge 34 pointing downwards, be stamped into an assembly part 2 wherein in the first case the welding element blank SR is positioned underneath the assembly part 2 and in the second case above the assembly part (FIG. 2A).

At the end of the stamping process there is already an assembly unit 1 in which the welding element S is fixed in the through bore 3 with a stability which is sufficient for numerous applications. The welding element blank SR forms in these cases after the stamping into the assembly part 2 exactly the welding element S without further processing steps being required for fixing it in the through bore 3. The cone portion 33 or the peripheral surface 29 of the welding element S expanding radially from the second end side 26 towards the first end side 25 forms a first form-fitting element F1 which provides a form-fitting engagement between the welding element S and the assembly part 2 in a direction R1 pointing towards the first end side 25 of the welding element S or the outside 39 of the assembly part 2.

The welding element S is preferably stamped into the assembly part 2 so that its second end side 26 whose diameter 28 is smaller than the diameter 27 of the first end side 25 is arranged on the assembly side 37 of the assembly part 2 wherein it aligns flush with the latter or protrudes with an overhang 38 therefrom. In the end assembly state, i.e. when the welding element S is welded onto the counter face 55 of the basic structure, the form-fitting engagement prevents in direction R1 through the first form-fitting element F1*a*, the assembly part 2 from becoming apart from the welding element S in the event of force applied in the counter direction, thus in the direction R2.

If the welding element S is to project out from the assembly part 2 with an overhang, thus with an overhang 38 from its assembly side 37 and/or with an overhang 43 from its outside 39, then a welding element blank SR is used whose thickness 11 is greater than the thickness 12 of the assembly part 2 in the hole edge region 21 of the through bore 3. When the assembly unit 1 is fixed on a basic structure 36 a gap 31 remains free as a result of the overhang 38 on the assembly side between the counter face 55 of the basic structure 36 and the assembly side 37 of the assembly part 2. A material layer 40 can be arranged in the gap 31 or on the assembly side 37 by way of example for sealing or insulation purposes. The overhang 43 on the outside has the advantage for example that when welding the assembly unit 1 to the basic structure 36 a welding electrode 44 can be applied to the first end side 25 of the welding element S without causing any undesired contact with the hole edge region 21 of the through bore 3, which is clearly apparent in FIG. 7A relating to a further design variation.

A form-fitting engagement between the welding element S and the assembly part 2 can also be achieved quite generally in that material of the welding element blank SR is forced radially outwards and thereby produces a form-fitting element which fixes the welding element blank SR or the welding element S in the through bore 3 and creates a positive locking engagement in the direction R1 or R2.

Thus for example the form-fitting engagement described above can be strengthened in the direction R1. More expediently for this purpose the material displacement in question is undertaken in that according to FIG. 3A-C a marginal ring groove 57 is introduced by means of an embossing punch 56 into the edge region of the first end side 25 of the welding element blank SR. The welding element blank SR is thereby supported with its second end side 26 on a counter holder 41. The embossing punch 56 has a ring projection 58 moulded complementary to the ring groove 57 on its side facing the outside 39 of the assembly part 2 during the course of the embossing process. When the ring projection 58 is pressed in the lift direction 48 into the first end side 25 of the welding element blank SR the ring groove 57 is formed wherein material belonging to the cylindrical longitudinal portion 30 of the welding element blank SR is forced radially outwards. The displaced material forms a further first form-fitting element F1b, thus one which fixes the welding element S in the through bore 3 with form-fitting engagement in the direction R1 facing the outside 37 of the assembly part 2.

As a result of the radial displacement the originally cylindrical peripheral surface of the longitudinal portion 30 of the welding element blank SR which is shown in FIG. 3B with a dotted line 32, forms a cone face which widens out towards the first end side 25. This adjoins practically directly the cone portion 33. The peripheral surface 29 of the welding element S thus forms as a whole a cone surface widening out to the first end side 25 of the welding element S. With the radial displacement of material of the cylindrical longitudinal portion 30 the material of the assembly part 2 which is softer than the material of the welding element blank SR yields so that the bore wall of the through bore 3 likewise forms as a whole a cone surface widening out towards the outside 39 of the assembly part 2.

The region of the embossing punch 56 arranged radially inside the ring projection 58 is formed by a recess 60. The region of the embossing punch 56 which surrounds the ring projection 58 radially on the outside is a bearing support surface 59 which runs parallel to a plane 50 which is spanned by the ring projection 58. The ring projection 58 projects over the bearing support surface 59 which at the end of the embossing process bears against the outside 39 of the assembly part (FIG. 3B). The depth 63 of the recess 60 is greater than the overhang 51 with which the ring projection 58 protrudes beyond the bearing support surface 59. In this way it is ensured that a central region 65 of the welding element S arranged radially inside the ring groove 57 is not axially compressed by the embossing punch 56 irrespective of the penetration depth of the ring projection 58, and therefore remains unchanged. On the other hand the radially outwardly displaced material region or the resulting form-fitting element F1b is axially compressed so that the central region 65 projects with an overhang 68 beyond the form-fitting element F1b. When the form-fitting element F1b lies flush with the outside 39 of the assembly part 2 the overhang 68 corresponds to the overhang 43 of the central region 65.

In the case of the embodiments described up until now the welding element S is fixed substantially with friction engagement in the through bore 3 in the direction R2 pointing towards the assembly side 37 of the assembly part 2. An increased stability in the direction R2 in the connection between the welding element S and the assembly part 2 can now likewise be achieved by a radially outwardly directed material displacement of the type mentioned above. For this according to FIG. 4A-C a likewise marginal ring groove 45 is introduced by means of an embossing punch 46 into the second end side 26 of the welding element blank SR preferably in addition to the ring groove 57 in the first end side 25 thereof.

The embossing punch 46 has for this purpose on its side facing the assembly side 37 of the assembly part 2 in the course of the embossing process a ring projection 47 formed complementary with the ring groove 45. When the embossing punch 46 is pressed in the lifting direction 48 into the second end side 26 of the welding element blank SR a material region of the welding element blank SR surrounding the ring groove 45 radially on the outside is displaced radially outwards. A second form-fitting element F2 is thereby formed, thus one which fixes the welding element S in the through bore 3 with a form-fitting engagement in a direction R2 pointing towards the assembly side 37. The material displacement thereby preferably takes place so that the form-fitting element which is thereby formed radially overlaps the assembly side 37 of the assembly part 2 in the hole edge region 21. After the second form-fitting element F2 has been formed, the original cone portion 33 of the welding element blank SR is practically no longer present as a result of the radially outwardly directed material displacement. The form-fitting engagement in the direction R2 is now substantially guaranteed by the second form-fitting element F2.

With the material displacement in question a shaping of the second form-fitting element F2 takes place at the same time. For this purpose the embossing punch 46 has a flat stop face 49 which surrounds the ring projection 47 concentrically wherein during the embossing process this stop face runs parallel to the assembly side 37 of the assembly part 2 or parallel to a plane 52 spanned by the ring projection 47. The region of the embossing punch 46 present between the stop face 49 and the ring projection 47 is formed by an annular recess 53. When the embossing punch 46 is driven forwards in the lifting direction 48 starting from the situation illustrated in FIG. 3A, material of the welding element blank SR is displaced through the ring projection 47 into the annular recess 53 wherein the second form-fitting element F2 is formed with a shape complementary to the annular recess 53 and with a defined overhang 38. The region of the embossing punch 46 located radially inside the ring projection 47 is a recess 66 whose depth 67 is greater than the overhang 68 with which the ring projection 47 protrudes beyond the stop face 49. It is thus ensured that a central region 54 of the welding element S arranged radially inside the ring groove 45 is not impinged by the embossing punch 46 irrespectively of the penetrating depth of the ring projection 47, and thus remains unchanged.

At the end of the punching stroke the stop face 49 of the embossing punch 46 bears against the assembly side 37 of the assembly part 2. The central region 54 of the second end side 26 of the welding element S located radially inside the ring groove 45 serves as the welding surface for welding with the counter face 55 of the basic structure 36. The central region 54 lies flush with the second form-fitting element F2 or protrudes slightly beyond same.

With the embodiment illustrated in FIGS. 5A and 5B an assembly part 2a is used which is clearly thinner than the assembly part 2a of the embodiments described above. The lesser thickness 12 of the assembly part 2a, with the uniform thickness 11 of the welding element blank SR, has the result that once pressed into the assembly part 2a the blank projects out from its assembly and outer side 37, 39 with correspondingly large overhangs 38' and 43' and furthermore in the case of very thin assembly parts 2a is not fixed with sufficient strength in the assembly part 2a. Therefore to increase the connecting strength a radially outwardly directed material displacement is carried out wherein form-fitting elements of the type described further above are formed radially overlapping the assembly and outer sides 37, 39. Furthermore the welding element S is displaced axially or in the direction R2 in the through bore 3 to adjust a predetermined overhang 38 on the assembly side which is reduced compared to the initial overhang 38'.

Figure 4A:
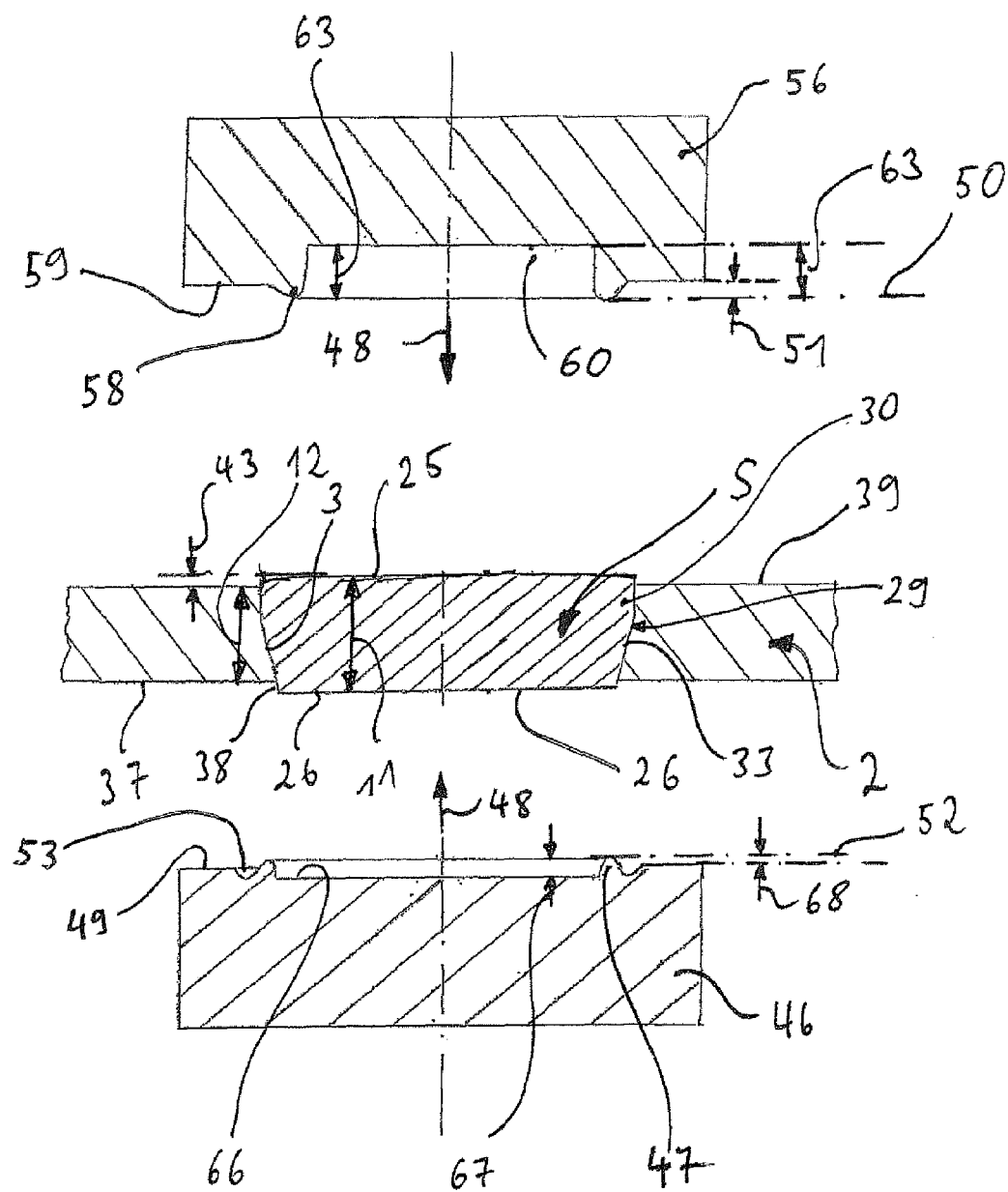
FIG. 4A-C a variation of the plastic deformation shown in FIG. 3A-C.
Figure 4B:
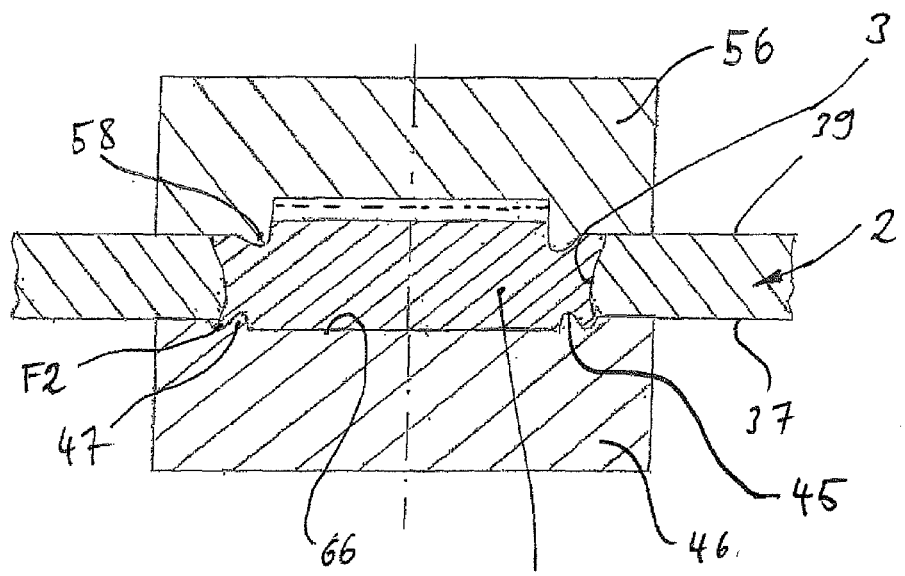
Figure 4C:
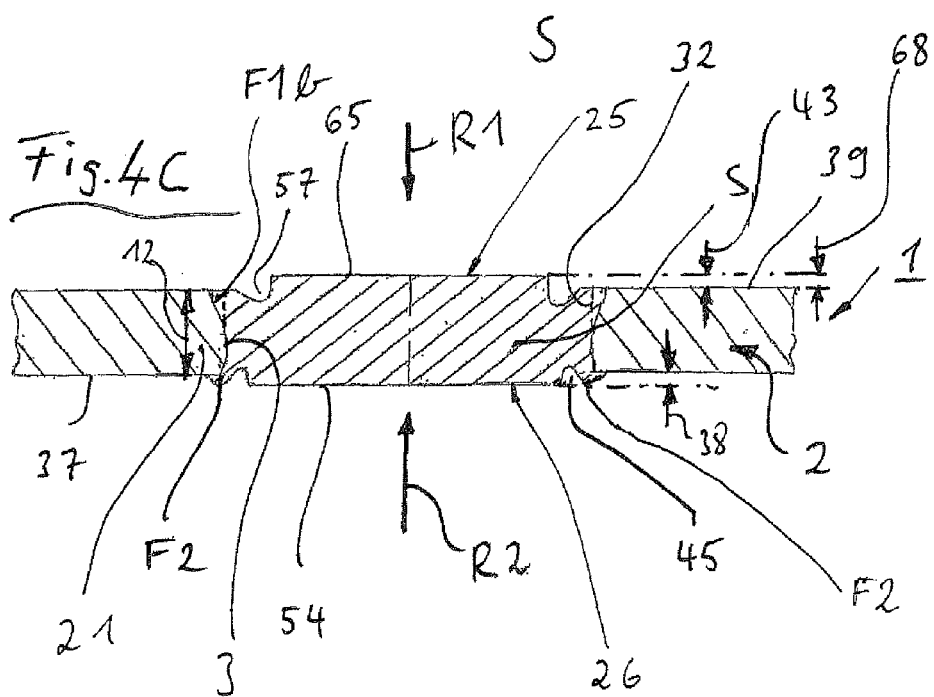

The production of the form-fitting elements takes place by means of embossing punches 56 and 46 of the type already shown in FIG. 4A which bias the welding element blank SR in the lift direction 48. The projections 58 and 47 thereby penetrate into the welding element blank SR through a radially outwardly directed material displacement and formation of a first form-fitting element F1c active in the direction R1, and the second form-fitting element F2 active in the direction R2. The welding element blank SR is moved relative to the assembly part 2a so far in the direction R2 that it has at the end of the embossing process the desired overhang 38 on the assembly side. With the formation of the second form-fitting element F2, thus when the ring projection 47 of the embossing punch 46 penetrates into the welding element blank SR, a radial material displacement also takes place inside the through bore 3. A loosening of the pressed bond between the welding element blank SR and assembly part 2a which arises as a result of the cone portion 33 moved in the direction R2 thus does not occur.

The radially outwardly directed material displacement by means of the embossing punch 56 or its ring projection 58 takes place so that the first form-fitting element F1c radially overlaps the outside 39 of the assembly part 2a in the hole edge region 21 in the manner of a flange. During the embossing process the first form-fitting element F1c which is being formed is axially compressed by the bearing support face 59 of the embossing punch 56 so that the—axially not compressed—central region 65 of the welding element S projects with an overhang 68 beyond the form-fitting element F1c. The thickness 69 of the form-fitting element F1c depends on the thickness 12 of the assembly part 2a which is used each time.

Figure 6A:
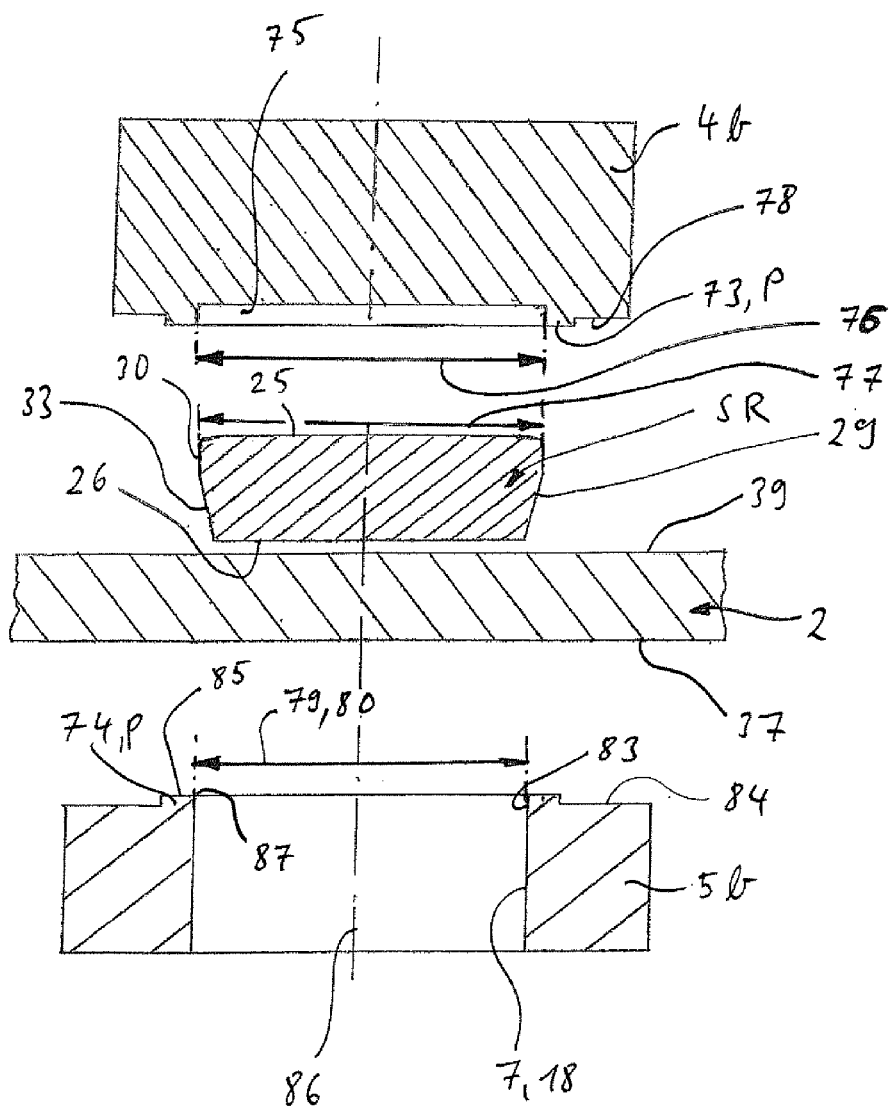

In the case of the method variation shown in FIG. 6A-C the strength of the connection between the welding element S and the assembly part 2 is achieved at least in one of the two directions R1, R2 by a radially inwardly directed displacement of the material of the assembly part 2. For this purpose an embossing element P is pressed into the outer side 39 and/or the assembly side 37 of the assembly part 2 to form one or more recesses. The radially inwardly displaced material of the assembly part 2 is thereby pressed against the welding element S. This has the result that welding element S is exposed to increased compression on its peripheral surface 29. Greater forces can thereby be transferred via the welding element S in the direction R1 and/or direction R2.

The material displacement in question is preferably undertaken during the course of the stamping of the welding element blank SR into the assembly part 2. A separate method step is thus not required with this procedure. The embossing element P is thereby provided on the punch 4b and/or the hole die 5b. In the case of the method variation in question, both the punch 4b and also the hole die comprise an embossing element P. This can be designed in the form of several individual projections or preferably in the form of a ring projection 73, 74. In the latter case the recess thereby forming in the outside 39 or in the assembly side 37 of the assembly part 2 is a ring groove 71 and 72 respectively formed complementary with the ring projection 73, 74.

The ring projection 73 of the embossing punch 4b protrudes from its side facing the outside 39 of the assembly part 2 during the course of stamping in the welding element blank SR. The ring projection 73 surrounds a recess 75 and has an inner diameter 76 which is only slightly larger than the diameter 77 of the cylindrical longitudinal portion 30 of the welding blank SR. The ring projection 73 is adjoined radially on the outside by a bearing support face 78 which bears against the outer side 39 of the assembly part 2 at the end of the stamping process (FIG. 6B). The depth of the recess 75 is measured so that any possible overhang 43 (FIG. 6B) with which the welding element S protrudes out from the outer side 39 finds space therein.

The ring projection 74 of the hole die 5b protrudes out from its side facing the assembly side 37 of the assembly part 2 during the aforementioned stamping process. Its inner diameter 79 corresponds to the diameter 80 of the die hole 7. The inside 83 of the ring projection 74 thus lies flush with the wall 18 of the die hole 7. The ring projection 74 is adjoined radially on the outside by a stop face 84. This stop face bears against the assembly side 37 of the assembly part 2 at the end of the stamping process according to FIG. 6B.

The inside 83 of the ring projection 74 with its upper side 85 which preferably runs at right angles to the central longitudinal axis 86 of the die hole 7, forms a cutting edge 87. This cutting edge 87 and the fact that the ring projection 74 and the cone portion 33 of the welding element blank SR axially overlap at the end of the stamping process, ensures that the stamped-out piece 35 can be removed from the assembly part 2 without problem.

In order to connect an assembly unit 1 made in the manner described above, to the basic structure 36 with the aid of two welding electrodes 44, 64, the assembly unit 1 is positioned on the counter face 55 of the basic structure 36 (FIG. 7A). One of the welding electrodes, the electrode 44 already mentioned above, is placed on the first end side 25 or on the central region 65 of the welding element S. Since this has an overhang 43 in relation to the outer side 39 of the assembly part 2, and an overhang 68 in relation to the first form-fitting element F1b, a laterally off-set position (dotted line in FIG. 7A) of the welding electrode 44 is possible without the latter coming into electrical contact with the hole edge region 21 of the through bore 3 and the form-fitting element F1b, which would subject the said region to unnecessary thermal stress. At the end of the welding process a welding zone 70 has been formed between the central region 54 of the welding element S on the assembly side, and the counter face 55 of the basic structure 36 (FIG. 7B).

The invention claimed is:

1. A method for manufacturing an assembly unit to be affixed to a counter face of a basic structure, the method comprising:
   providing an assembly part having an assembly side and an outer side facing away therefrom, the assembly part being formed of a material that cannot be welded with a material of the counter face of the basic structure;
   providing a welding element blank to be fixed in a through bore to be formed in the assembly part, the welding element blank being formed of a material that can be welded with the material of the counter face of the basic structure;
   the assembly part not yet having the through bore formed therein;
   stamping the welding element blank with a first end side, a second end side, and a peripheral surface out of a sheet metal blank by way of a first punch and a first hole die to form a peripheral surface having a cylindrical longitudinal portion extending away from the first end side, and an adjoining cone portion tapering towards the second end side and forming therewith a cutting edge, the first punch engaging the second end side; and
   stamping the welding element blank with the cutting edge as a leading edge into the assembly part by way of a second punch and a second hole die to thereby form the through bore in the assembly part, the second punch engaging the first end side.

2. The method according to claim 1, wherein the welding element blank consists of a material having a greater hardness compared with the material of the assembly part.

3. The method according to claim 1, which comprises stamping the welding element blank into the assembly part from an outer side of the assembly part opposite the assembly side of the assembly part.

4. The method according to claim 1, which comprises plastically deforming the welding element blank by way of an embossing punch separate from the first and second punches so that material of the welding element blank is displaced radially outwards and a form-fitting element is thereby formed which fixes the welding element blank in the through bore.

5. The method according to claim 4, wherein a thickness of the welding element blank is greater than a thickness of the assembly part in a hole edge region of the through bore wherein the welding element blank is plastically deformed by the embossing punch, so that the radially outwardly displaced material of the welding element blank radially overlaps the assembly side or the outer side of the assembly part in the hole edge region.

6. The method according to claim 4, which comprises, for radially displacing the material into an edge region of the first or the second end side of the welding element blank, pressing in a ring projection on the embossing punch to form an annular groove.

7. The method according to claim 6, which comprises employing an embossing punch which has a stop face engaging round the ring projection, running parallel to a plane spanned by the ring projection and bearing against the assembly side of the assembly part at the end of a stamping stroke, wherein the region of the embossing punch located between this stop face and the ring projection is formed by an annular recess.

8. The method according to claim 1, which comprises displacing material of the assembly part radially inwards by pressing an embossing element of the second punch or the second hole die in a hole edge region of the through bore into the assembly side or the outer side of the assembly part.

9. The method according to claim 8, which comprises providing the embossing element on the second punch or the second hole die.

10. The method according to claim 8, wherein the embossing element is a ring projection.

11. The method according to claim 1, which comprises:
   providing a welding element blank having a measured thickness that is suitable for manufacturing the assembly unit with assembly parts of different thicknesses; and
   introducing the welding element blank in the respective assembly part so that the welding element blank projects with a predetermined overhang out from an assembly side.

12. A method for manufacturing an assembly unit to be affixed to a counter face of a basic structure, the method comprising:
   providing an assembly part having an assembly side and an outer side facing away therefrom, the assembly part being formed of a material that cannot be welded with a material of the counter face of the basic structure;
   providing a welding element blank to be fixed in a through bore to be formed in the assembly part, the welding element blank being formed of a material that can be welded with the material of the counter face of the basic structure;
   stamping the welding element blank out of a sheet metal blank with a punch and a hole die, the welding element blank having a punch end side engaged by the punch, a die end side opposite the punch end side, and a peripheral surface, the punch end side defining a cutting edge; and
   stamping the welding element blank with the cutting edge as a leading edge into the assembly part by way of a further punch and a further hole die to fix the welding element into the assembly part, the further punch engaging the die end side.

* * * * *